United States Patent
Gaterman et al.

(10) Patent No.: US 8,474,426 B1
(45) Date of Patent: Jul. 2, 2013

(54) ROLLER LIFTER ASSEMBLY

(75) Inventors: William Gaterman, Daytona Beach, FL (US); Brad A. Miller, Ormond Beach, FL (US)

(73) Assignee: William Gaterman, Daytona Beach, FL (US)

( * ) Notice: Subject to any disclaimer, the term of this patent is extended or adjusted under 35 U.S.C. 154(b) by 363 days.

(21) Appl. No.: 12/940,693

(22) Filed: Nov. 5, 2010

(51) Int. Cl.
*F01L 1/14* (2006.01)

(52) U.S. Cl.
USPC ............ 123/90.48; 123/90.55; 123/90.52; 123/90.43

(58) Field of Classification Search
USPC ........... 123/90.52, 90.43, 90.48, 90.55, 90.59
See application file for complete search history.

(56) References Cited

U.S. PATENT DOCUMENTS

| | | | |
|---|---|---|---|
| 2,763,314 A | 9/1956 | Gill | |
| 3,682,508 A * | 8/1972 | Briles | 411/176 |
| 4,741,298 A | 5/1988 | Rhoads | |
| 4,809,651 A * | 3/1989 | Gerchow et al. | 123/90.5 |
| 5,788,039 A | 8/1998 | Carpi et al. | |
| 2007/0041784 A1 | 2/2007 | Davis | |

* cited by examiner

*Primary Examiner* — Zelalem Eshete
(74) *Attorney, Agent, or Firm* — Egbert Law Office, PLLC

(57) ABSTRACT

A roller lifter assembly has a lifter body with a leg extending outwardly therefrom, a bar having a elongated slot formed therein, a first rivet having a head and a shank, a button affixed to the shank of the rivet so as to sandwich the bar between the button and the leg of the lifter body. The head of the rivet has a surface adjacent to the shank that bears against a curved inner surface of the leg of the lifter body so as to prevent the rivet from rotating. The shank extends through the hole in the leg and through the elongated slot of the bar. The rivet is positioned so as to as to be non-rotatable during the movement of the lifter bodies.

13 Claims, 1 Drawing Sheet

ROLLER LIFTER ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to roller lifter assemblies. More particularly, the present invention relates to the joining of a tie bar of between a first lifter body and a second lifter body of a roller lifter assembly. More particularly, the present invention relates to fastening techniques for preventing the rivet and the lifter bodies from rotating during the movement of the lifter bodies.

2. Description of Related Art Including Information Disclosed Under 37 CFR 1.97 and 37 CFR 1.98.

An overhead valve engine is a type of piston engine that places the camshaft within the cylinder block and uses push rods to actuate rocker arms above the cylinder head to actuate the valves. The overhead valve engine is often referred to as a pushrod engine or an I-head engine. Lifters or tappets are located in the engine block between camshaft and the pushrods.

Typically, tappets or lifters are engineered to last a lifetime of the engine when the engine is properly maintained with proper oil and filter changes. On most overhead cam engines, the camshaft is directly over the valves. In some other overhead cam engines, a rocker arm pivots on a fixed shaft while one projection of the rocker arm rides on a cam of the rotating camshaft. In both cases, this creates an oscillating linear motion, opening the valve. The closing of the valve is typically accomplished by a compression spring placed between valve collet (or retainer) and the cylinder head above the combustion chamber. In overhead valve engines, the camshaft is located near the crankshaft and motion of the cam lobes is followed by cam followers (similar to lifters) and transferred up to the cylinder head and the rocker arm assembly by means of pushrods.

FIG. 1 shows a prior art roller lifter assembly. The roller lifter assembly in FIG. 1 includes a first lifter body 12 and a second lifter body 14. The first lifter body 12 has a roller 16 rotatably mounted at one end thereof. The second lifter body 14 has a roller 18 rotatably mounted at one end thereof. The rollers 16 and 18 are suitable for rolling along the lobes of the camshaft.

In FIG. 1, it can further be seen that there is a tie bar 20 that is longitudinal member that extends between the first lifter body 12 and the second lifter body 14. The tie bar 20 serves to connect the ends of the lifter bodies 12 and 14 opposite to that of the rollers 16 and 18. The buttons 22 and 24 are mounted over the tie bar 20 so as to secure the tie bar into a proper position. Typically, the tie bar will have a slightly slotted opening so as to receive the rivet shaft therein. The buttons 22 and 24 serve to secure the tie bar 20 into a proper position.

In FIG. 2, the opposite view of the roller lifter assembly 10 is shown. In FIG. 2, the first lifter body 12 and the second lifter body 14 are illustrated as connected to the tie bar 20. The ends of the roller lifter bodies 12 and 14 have a slightly concave surface. This concave end surface has an opening that receives rivets 26 and 28 therein. The rivets 26 and 28 will have a generally flat head with a flat undersurface that connects, by a shank, to the tie bar 20.

In the prior art illustrated in FIGS. 1 and 2, the tie bar 20 extends between the lifter bodies 12 and 14. Since the lifters will move upwardly and downwardly, a certain amount of twist will be associated with the lifters. The riveted connection of the tie bars to the lifter bodies attempts to prevent the lifters from rotating about a centerline. As such, there can be a certain amount of bending between the lifter bodies 12 and 14 and the tie bar. Eventually, a certain amount of rotation of the lifter bodies 12 and 14 will occur about the respective axes thereof. As such, a certain amount of binding will occur between the lifter bodies 12 and 14 and the tie bar 20. As such, a need has developed so as to establish a proper riveted connection between the tie bar and the lifter bodies which effectively prevents the lifter bodies from rotating, and eventually binding, with respect to the tie bar.

In the past, various patents have issued have issued relating to structures associated with rivets. U.S. Pat. No. 2,763,314, issued on Sep. 18, 1956 to R. H. Gill, shows an expansible hollow threaded rivet having a buttress portion to provide for increased resistance to shear. The rivet has a tubular body formed of a ductile material and uniform outside diameter. A generally flat head extends radially outwardly of the body at one end thereof.

U.S. Patent Publication No. 2007/0041783, published on Feb. 22, 2007 to M. Davis, describes a locking device for preventing rotation of one component relative to another component to which it is connected. The locking device comprises a locking plate having a component-engaging portion to engage one component. A surface of the locking plate is grooved to engage with the grooved surface carried by the other component. One or more fixing holes are provided for one or more fixing members to pass through in order to force the grooved surface of the locking plate into engagement with the grooved surface carried by the other component.

U.S. Pat. No. 4,741,298, issued on May 3, 1988 to G. E. Rhoads, describes a rollerized timing lifter for use in high performance engines. This lifter has a press-fit hydraulic mechanism utilizing an oil supply feed means from the roller body through and to the hydraulic mechanism. It has structure to maintain a self-adjusting lifter to zero valve lash due to engine wear and heat expansion. It further includes a method of altering valve timing automatically through an oil restricted oil bleed passage way leading to the pressure chamber so as to allow a leak down or delay of valve timing at low speeds.

U.S. Pat. No. 5,788,039, issued on Aug. 4, 1998 to Carpi et al., describes a clutch cover and clutch having such a cover. There are balancing holes for fixing a balancing device. At least one recess is formed in the cover adjacent to one of the balancing holes wherein the recess reduces the local thickness of the cover plate.

It is an object of the present invention to provide a roller lifter assembly that effectively avoids the rotation of the rivet during the movement of the lifter bodies.

It is another object of the present invention to provide a roller assembly that avoids the rotation of the rivet and maintains the centerline of the rivet in a generally fixed position.

It is another object of the present invention to provide a roller assembly that effectively prevents the binding of the roller lifter assembly.

It is still another object of the present invention to provide a roller assembly which is easy to manufacture, easy to install, and respectively inexpensive.

These and other objects and advantages of the present invention will become apparent from a reading of the attached specification and appended claims.

BRIEF SUMMARY OF THE INVENTION

The present invention is a roller lifter assembly that includes a roller lifter body having a leg extending outwardly therefrom, a bar having a first elongated slot formed therein, a first rivet having a head and a shank, and a first button affixed to the shank of the first rivet. The leg has a curved inner surface. This leg has a hole formed therein. The head has a surface adjacent to the shank that bears against the curved inner surface of the lifter body so as to prevent the first rivet from rotating. The shank extends through the hole of the leg of the lifter body and through the first elongated slot of the bar. The bar is sandwiched between first button and the leg of the first lifter body. The leg of the lifter body can be a cylindrical extension of the roller lifter body.

The surface of the head of the first rivet has a curved shape conforming to the curvature of the curved surface of the leg and the first lifter body. The leg of the first lifter body has at least one tang formed adjacent the hole thereof. The head of the rivet engages with the tang. The underhead of the first rivet is concave. The first button has a flat surface adjacent the bar and a step extending into the first elongated slot of the bar. The first button has a hole formed therein. The first button has milled slots extending radially from the hole. The shank of the first rivet extends into at least one of the milled slots.

The roller lifter assembly of the present invention also includes a second lifter body having a leg with a curved inner surface. The leg of the second lifter body has a hole formed therein. The bar has a second elongate slot in spaced relationship to the first elongated slot. A second rivet also has a head and a shank. The head of the second rivet has an undersurface adjacent the shank thereof but bears against the curved inner surface of the leg of the second lifter body so as to prevent the second rivet from rotating. The shank extends through the hole in the leg of the second lifter body and through the second elongated slot of the bar. A second button is affixed to the shank of the second rivet. The bar is sandwiched between the second button and the leg of the second lifter body. The "leg" of the second lifter body can be a cylindrical extension of the lifter body.

The leg of the first lifter body has a flat outer surface positioned adjacent the bar. The shank of the first rivet extends through a hole in the first button such that an end of the shank opposite the head of the shank of the first rivet extends outwardly of the first button.

The rivet of the present invention can be a threaded bolt. The rivet can be solid or tubular. Also, the rivet can be stepped, straight, or of various other shapes. The shank of the rivet can be of a cross-sectional shape. The underhead of the rivet is preferably concave, but it can have other configurations that inhibit rotation. Additionally, the outside profile of the head of the rivet can be round, square, or of other shapes.

Within the concept of the present invention, the button can have any outside shape. The button can either have milled slots and can be utilized without such milled slots. If no milled slots are used, then other items, such as an internal hex, a spline, or similar structures can be utilized. Still further, it is possible that the button has nothing extending from the hole and is simply engaged with the shank of the rivet. The button can be internally threaded. The button can be made of a variety of components. In the present invention, the button an rest on the flat surface of the lifter and consequently may not be flat where the button meets the lifter. In other circumstances, the button may not rest on the flat surface of the lifter. The button can also be slotted perpendicular to its axis in order to accommodate the bar.

DETAILED DESCRIPTION OF THE INVENTION

Figure 1:
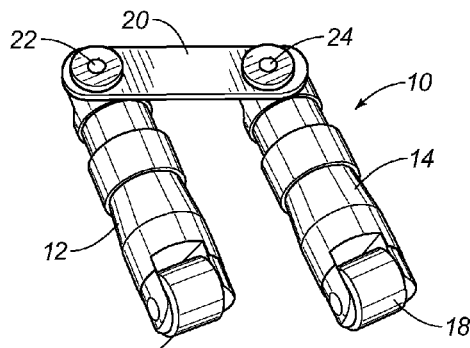
FIG. 1 is a frontal view showing a prior art roller lifter assembly.
Figure 2:
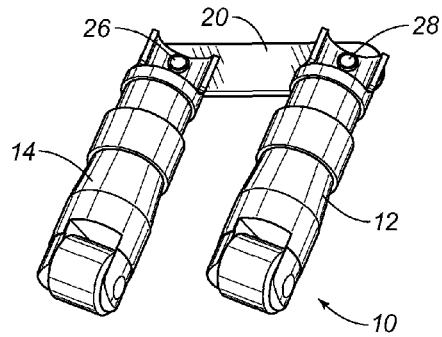
FIG. 2 is a back view showing the prior art roller lifter assembly of FIG. 1.
Figure 3:
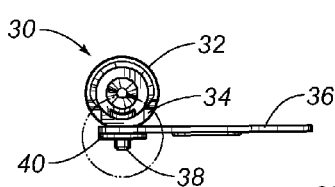
FIG. 3 is an end view showing the connection between the first lifter body and the bar of the present invention.

Referring to FIG. 3, there is shown the roller lifter assembly 30 in accordance with the teachings of the present invention. The roller lifter assembly 30 includes a first lifter body 32 having a leg 34 extending outwardly therefrom. The leg 34 is a cylindrical-shape extension of the first lifter body 32. It can be seen that the leg 34 has a curved inner surface. A bar 36 is affixed to the leg 34 of the lifter body 32. A rivet 38 has a head positioned against the curved inner surface of the leg 34 of the lifter body 32 and a shank extending through a slot of the bar 36 and outwardly through a hole formed in a button 40. It can be seen that the button 40 sandwiches the end of the bar 36 between the leg 34 of the lifter body 32 and the button 40.

Figure 4:
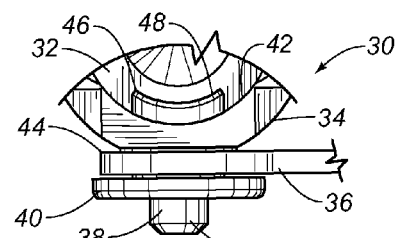
FIG. 4 is a magnified view of the circled area of FIG. 3.

FIG. 4 is a magnified view of the circled area of FIG. 3. In particular, it can be seen that the leg 34 of the lifter body 32 has a curved inner surface 42. The bar 36 has a flat surface disposed against a flat surface 44 of the leg 34 of the lifter body 32. The head 46 of the rivet 38 has a concave top surface 48 and a concave surface bearing against the inner surface 42 of the leg 34 of lifter body 32. In this manner, the curved relationship between the surface of the head 46 of rivet 38 and the inner surface of the leg 34 of lifter body 32 will prevent the head 46 of rivet 38 from rotating. The concave surface may only be formed on the underside of the head 46. The top surface 48 can be of any shape.

In FIG. 4, it can be seen that the button 40 is positioned over the shank 50 of the rivet 46. The button 40 is secured so as to be positioned against of the bar 36 opposite the leg 34 of lifter body 32.

Figure 5:
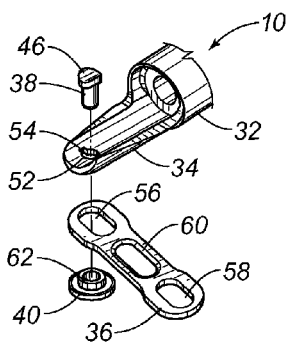
FIG. 5 is an exploded view showing the connection between the rivet, the leg of the lifter body, the bar and the button.

FIG. 5 shows an exploded view of the roller lifter assembly 10 of the present invention. In particular, the lifter body 32 is illustrated as having leg 34 extending outwardly therefrom. The leg 34 has a curved inner surface (as described hereinbefore) and a hole 52 formed therethrough. It can be seen that the hole 52 has a tang 54 extending radially therefrom.

The bar 36 has a first elongated slot 56 and a second elongated slot 58. The second elongated slot 58 is spaced relationship to the first elongated slot 56. A stamped rib 60 is formed between the elongated slots 56 and 58.

The cap 40 is illustrated as having a step 62 formed thereon. The step 62 is suitable for being received within the first elongated slot 56. As such, the remainder of the button 40 will reside against the surface of the bar 36. The rivet 38 is illustrated as extending through the hole 52, through the first elongated slot 56, and through an opening in the button 40. As such, the rivet 38 can be engaged in the hole 52 of leg 34 of lifter body 32.

In the present invention, an orbital riveter is used so as to install rivet 38. This orbital riveter will spin the rivet 38 into its desired position. The material of the rivet 38 will flow and will keep the rivet from cracking. The head 48 of the rivet 38 will spread outwardly into the tang 54. Once again, the material of the head 48 that spreads into the tang 54 will prevent the rivet 38 from rotating.

Figure 6:
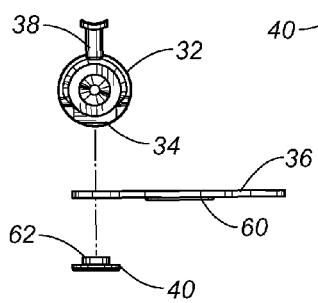
FIG. 6 is an end exploded view showing the connection between the rivet, the leg of the lifter body, the bar and the button.
Figure 7:
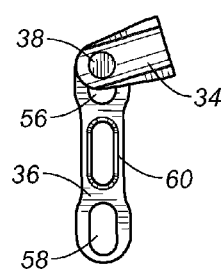
FIG. 7 is a frontal view showing the connection between the bar and the leg of the lifter body.

FIG. 6 further shows the installation of the rivet 38 as extending through the leg 34 of lifter body 32 and then through the elongated slot 36. The button 40 is illustrated as having the step 62 formed on a surface thereof. The shank of the rivet 38 will be engaged through the hole in the button 40 so that the button 40 is fixedly engaged with the shank FIG. 7 shows the bar 36 as affixed to and extending from the leg 34 of the lifter body 32. It can be seen that the first elongated slot 56 receives the rivet 38 therein. The elongated slot 56 allows relative movement of the bar 36 relative to the rivet 38 and the leg 34 of the lifter body 32. The second elongated slot 58 can be joined to another lifter body in the same manner as described hereinbefore.

Figure 8:
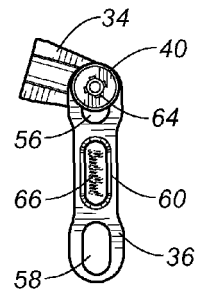
FIG. 8 is a back view of the bar as secured to the leg of the lifter body and showing, in particular, the milled slots in the button.

FIG. 8 shows another view of the bar 36 as extending from the end of the leg 34. Importantly, in FIG. 8, it can be seen that the button 40 has milled slot 64 extending radially outwardly of a hole in the center of the button 40. The milled slot 64 allows the material of the shank 50 of the rivet 38 to be received therein. During the assembly of the rivet 38 in the present invention, the orbital riveter will cause the material of the shank to flow into the milled slot 64 in order to fix the rivet from rotation. FIG. 8 further shows the second elongated slot 58 as positioned away from the first elongated slot 56. The rib 60 can include indicia 66 imprinted therein.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A roller lifter assembly comprising:
   a first lifter body having a leg extending outwardly therefrom, said leg having a curved inner surface, said leg having a hole formed therein;
   a bar having a first elongated slot formed therein;
   a first rivet having a head and a shank, said head having a surface adjacent said shank bearing against said curved inner surface of said first lifter body so as to prevent said first rivet from rotating, said shank extending through said hole in said leg of said first lifter body and through said first elongated slot of said bar, said surface of said head of the first rivet having a curved shape conforming to the curvature of and bearing against said curved surface of said leg of said first lifter body; and
   a first button affixed to said shank of said first rivet, said bar sandwiched between first button and said leg of said first lifter body.

2. The roller lifter assembly of claim 1, said leg of said first lifter body having at least one tang formed adjacent said hole thereof, said head of said rivet engaged with the tang.

3. The roller lifter assembly of claim 1, said head of said first rivet being concave.

4. The roller lifter assembly of claim 1, said first button having a flat surface adjacent said bar and a step extending into the first elongated slot of said bar.

5. The roller lifter assembly of claim 1, said first button having a hole formed therein, said first button having milled slots extending radially from said hole, said shank of said first rivet extending into at least one of the said milled slots.

6. The roller lifter assembly of claim 1, further comprising:
   a second lift body having a leg extending outwardly therefrom, said leg of said second lifter body having a curved inner surface, said leg of said second lifter body having a hole formed therein, said bar having a second elongate slot in spaced relationship to said first elongated slot;
   a second rivet having a head and a shank, said head of said second rivet having a surface adjacent said shank thereof bearing against said curved inner surface of said leg of said second lifter body to prevent said second rivet from rotating, said shank extending through said hole in said leg of said second lifter body and through said second elongated slot of said bar; and
   second button affixed to said shank of said second rivet, said bar being sandwiched between said second button and said leg of said second lifter body.

7. The roller lifter assembly of claim 1, said leg of said first lifter body having a flat outer surface positioned adjacent said bar.

8. The roller lifter assembly of claim 1, said shank of said first rivet extending through a hole in said first button such that an end of said shank opposite said head of said shank of said first rivet extends outwardly of said first button.

9. A roller lifter assembly comprising:
   a lifter body having a leg extending outwardly therefrom, said leg having an inner surface, said leg having a hole formed therein, said leg of said lifter body having at least one tang extending outwardly of said hole;
   a bar having a first elongated slot formed therein;
   a rivet having a head and a shank, said head being non-rotatably positioned against said inner surface of said leg of said lifter body, said shank extending through said hole in said leg and through said first elongated slot of said bar, said head of said rivet having material thereof received by the tang; and
   a button affixed to said shank of said rivet, said bar sandwiched between said first button and said leg of said lifter body, said button having a hole formed therein, said button having milled slots extending radially from said hole at an outer surface of said button, said shank of said rivet extending into at least one of said milled slots.

10. The roller lifter assembly of claim 9, said head having a surface adjacent said shank bearing against said inner surface of said leg of said lifter body so as to prevent said rivet from rotating in said hole of said leg.

11. The roller lifter assembly of claim 9, said surface of said head having a curvature conforming to a curvature to said inner surface of said leg of said lifter body.

12. The roller lifter assembly of claim 9, said button having a flat surface adjacent said bar and a step extending into said first elongated slot of said bar.

13. A roller lifter assembly comprising:
- a lifter body having a leg extending outwardly therefrom, said leg having curved inner surface, said leg having a hole formed therein;
- a bar having a first elongated slot formed therein;
- a rivet having a head and a shank, said head having a surface with a curvature adjacent said curved inner surface of said leg of said lifter body, said surface of said head nested against said curved surface of said leg, said shank extending through said hole in said leg of said lifter body and through said first elongated slot of said bar; and
- a button affixed to said shank of said rivet, said bar sandwiched between said button and said leg of said lifter body, said button having a flat surface bearing against a side of said bar opposite said leg.

* * * * *